United States Patent
Fletzer et al.

(10) Patent No.: US 11,066,787 B2
(45) Date of Patent: Jul. 20, 2021

(54) WELDING APPARATUS FOR WELDING RAILS OF A TRACK

(71) Applicant: PLASSER & THEURER EXPORT VON BAHNBAUMASCHINEN GESELLSCHAFT M.B.H., Vienna (AT)

(72) Inventors: Robert Fletzer, Voesendorf (AT); Heinz Muehlleitner, Neidling (AT)

(73) Assignee: Piasser & Theurer Export von Bahnbaumaschinen GmbH, Vienna (AT)

( * ) Notice: Subject to any disclaimer, the term of this patent is extended or adjusted under 35 U.S.C. 154(b) by 267 days.

(21) Appl. No.: 16/073,171

(22) PCT Filed: Jan. 9, 2017

(86) PCT No.: PCT/EP2017/000018
§ 371 (c)(1),
(2) Date: Jul. 26, 2018

(87) PCT Pub. No.: WO2017/133828
PCT Pub. Date: Aug. 10, 2017

(65) Prior Publication Data
US 2019/0032283 A1  Jan. 31, 2019

(30) Foreign Application Priority Data
Feb. 4, 2016  (AT) .................................. A 56/2016

(51) Int. Cl.
*E01B 29/46* (2006.01)
*B23K 11/11* (2006.01)
*B23K 31/02* (2006.01)
*B23K 101/26* (2006.01)

(52) U.S. Cl.
CPC .............. *E01B 29/46* (2013.01); *B23K 31/02* (2013.01); *B23K 2101/26* (2018.08)

(58) Field of Classification Search
CPC ..... B23K 31/02; B23K 2101/26; E01B 11/44; E01B 31/18
See application file for complete search history.

(56) References Cited

U.S. PATENT DOCUMENTS

| 5,389,760 A | 2/1995 | Zollinger |
| 5,469,791 A * | 11/1995 | Theurer ................. E01B 31/02 104/5 |
| 8,735,761 B2 | 5/2014 | Theurer et al. |
| 8,979,083 B2 | 3/2015 | Theurer et al. |

(Continued)

FOREIGN PATENT DOCUMENTS

| CH | 703854 A2 | 3/2012 |
| CN | 103817422 A | 5/2014 |

(Continued)

*Primary Examiner* — Brian W Jennison
(74) *Attorney, Agent, or Firm* — Laurence A. Greenberg; Werner H. Stemer; Ralph E. Locher

(57) ABSTRACT

A welding apparatus for welding rails of a track comprises two welding units which are movable relative to one another and which are each equipped with clamping jaws at a lower end. The clamping jaws are configured for resting on a web of the rail. Each welding unit is connected to a supporting device which can move relative to the welding unit and which is provided for resting on the track during operation.

7 Claims, 2 Drawing Sheets

(56) References Cited

U.S. PATENT DOCUMENTS

| | | | |
|---|---|---|---|
| 2002/0125216 A1 | 9/2002 | Sauron et al. | |
| 2011/0168675 A1* | 7/2011 | Theurer | B23K 11/0073 |
| | | | 219/53 |
| 2016/0199925 A1* | 7/2016 | Fletzer | B23K 11/046 |
| | | | 409/300 |

FOREIGN PATENT DOCUMENTS

| | | |
|---|---|---|
| EP | 0597215 A1 | 5/1994 |
| EP | 2315877 B1 | 2/2012 |
| GB | 2219761 A | 12/1989 |
| WO | 2004111340 A1 | 12/2004 |
| WO | 2010063362 A1 | 6/2010 |

\* cited by examiner

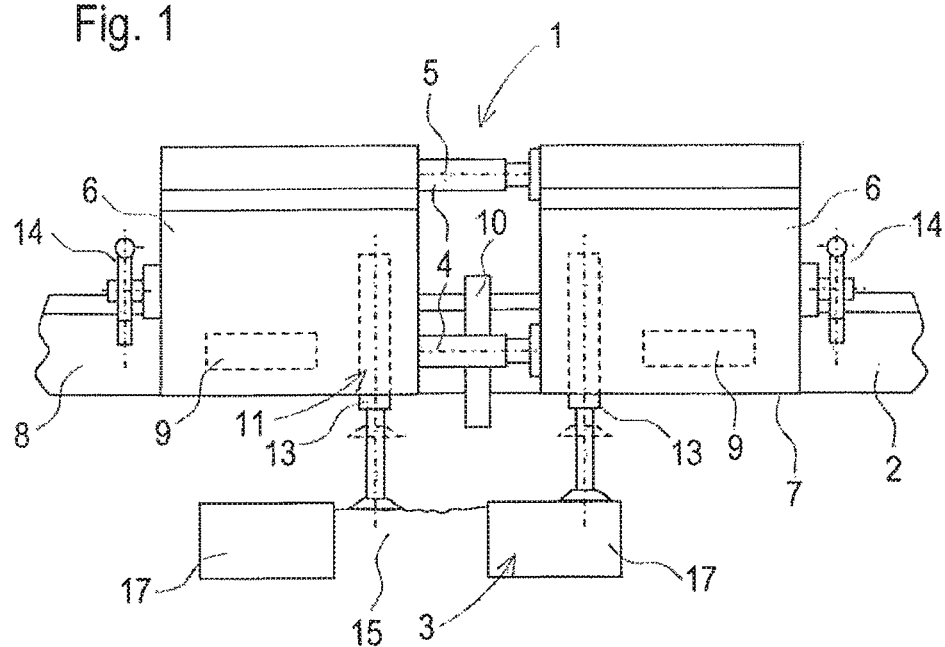
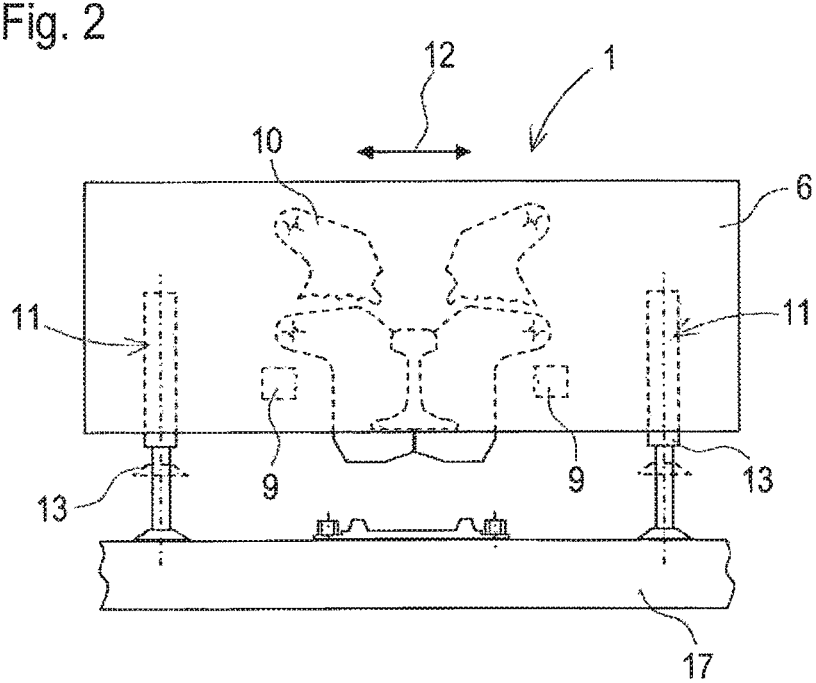

WELDING APPARATUS FOR WELDING RAILS OF A TRACK

BACKGROUND OF THE INVENTION

Field of the Invention

The invention relates to a welding head for welding rails of a track, having two welding units movable towards one another along unit guides in a guide longitudinal direction, each welding unit being equipped at a lower end with clamping jaws provided to be applied to a rail web.

A welding head of this type is known from WO 2010063362. On each of the two welding units designed to be moved towards one another, two clamping jaws are provided for being pressed to the rail web, the clamping jaws being linear displaceable perpendicularly to the longitudinal direction of the rails in a pressing plane.

Also known, according to EP 0 597 215 A1 or CH 703 854 A2, are welding heads in which the clamping jaws are pressed to the rail web by rotating an eccentric shaft.

SUMMARY OF THE INVENTION

It is the object of the present invention to provide a welding head of the type mentioned at the beginning with which a simplified execution of the welding operation is possible.

According to the invention, this object is achieved with a welding head of the specified kind in that at least one welding unit is connected to a support device, displaceable relative to the welding unit, which is provided for placement on the track during working operations.

By means of a support device of this kind, it is possible to employ a smaller crane for moving the welding head to the welding site, since the forces generated by the tensions of the raised rails during the welding operation are transmitted in an advantageous manner directly to the track by the support device. Furthermore, the support devices—if designed sledge-like—can also reliably preclude any disadvantageous friction of the welding head with the sleepers during movement of the two welding units towards one another. A further advantage of the invention lies in the fact that a quick—and, for the crane, stress-free—lifting of the welding head only to the absolutely necessary extent for carrying out a finalizing weld bead removal is possible, so that a shearing knife can be moved without hindrance underneath a rail base.

Additional advantages of the invention become apparent from the dependent claims and the drawing description.

BRIEF DESCRIPTION OF THE SEVERAL VIEWS OF THE DRAWING

The invention will be described in more detail below with reference to embodiments represented in the drawing in which FIGS. 1, 3 and 4 each show a simplified side view of a welding head, and FIG. 2 shows a view in a longitudinal direction of the rails.

DESCRIPTION OF THE INVENTION

Figure 3:
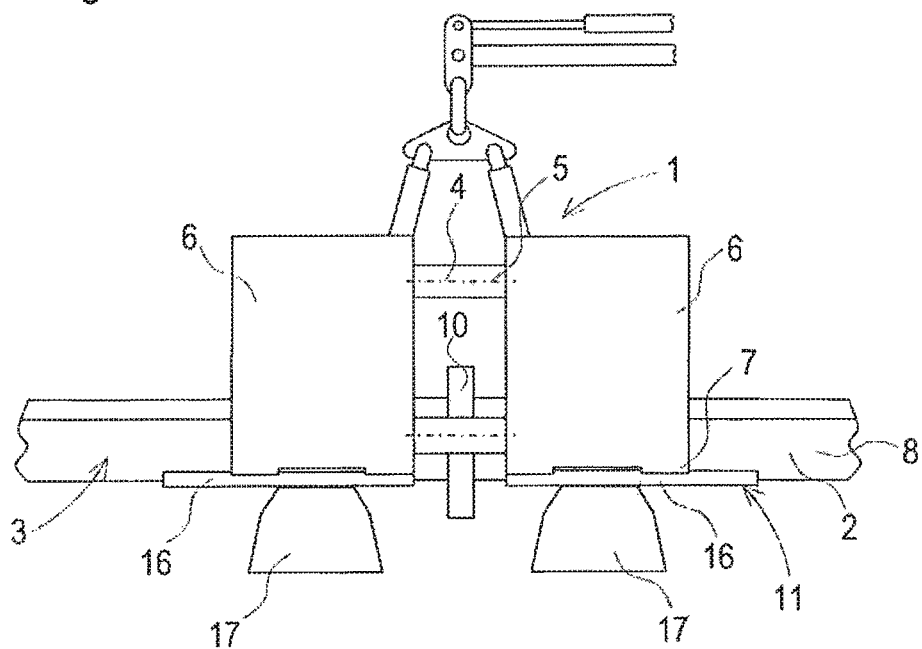

A welding head 1, shown in FIGS. 1 and 2, for welding rails 2 of a track 3 is composed of two welding units 6 which are movable towards one another along unit guides 4 in a longitudinal direction 5 of the guides or rails. At a lower end 7—with regard to a vertical—said welding units 6 are equipped in each case with clamping jaws 9 provided for being applied to a rail web 8.

Located between the two welding units 6 is a shearing device 10 for shearing off a weld bead. The welding head 1, which is already known in more detail from EP 2 315 877 and which is therefore not described further, is connected to a crane, not further shown, for transport to the welding site (see FIG. 3).

At the lower end 7 adjoining the clamping jaws 9, both welding units 6 are connected in each case to two support devices 11 provided for being placed on the track 3 during working operations. Said support devices 11 are arranged at a distance from one another in a unit transverse direction 12 extending perpendicularly to the guide longitudinal direction 5, wherein the clamping jaws 9 are each positioned between the two support devices 11. Each of the support devices 11 is designed as a support ram 13 hydraulically adjustable with regard to a vertical relative to the welding unit 6.

For the welding operation, the welding head 1 is centred above the two rails 2 to be welded to one another and lowered enough to allow the two welding units 6 to be moved without hindrance towards one another for the welding operation. Next, the two rails 2 are gripped by two rail tongs 14 and lifted slightly. In this, the rails 2 are pressed against a stop positioned between the clamping jaws 9.

After finishing the welding operation, the support rams 13 are hydraulically actuated and extended in vertical direction in order to finally support the welding head 1 on the sleepers and/or ballast 15 located between the same. In this, the welding head 1 is distanced in vertical direction from the track 3 only so far that the two lowered parts of the shearing device 10 can be folded up without problem underneath the rail base for the subsequent process of shearing off the weld bead. During this, the rail 2 remains in a state clamped by the clamping jaws 9. The forces hence resulting from the rail deflection are thus absorbed by the support rams 13 while relieving the above-mentioned crane.

In an alternative minimal variant, however, it would also be possible to arrange two support rams 13 merely on one of the two welding units 6.

Figure 4:
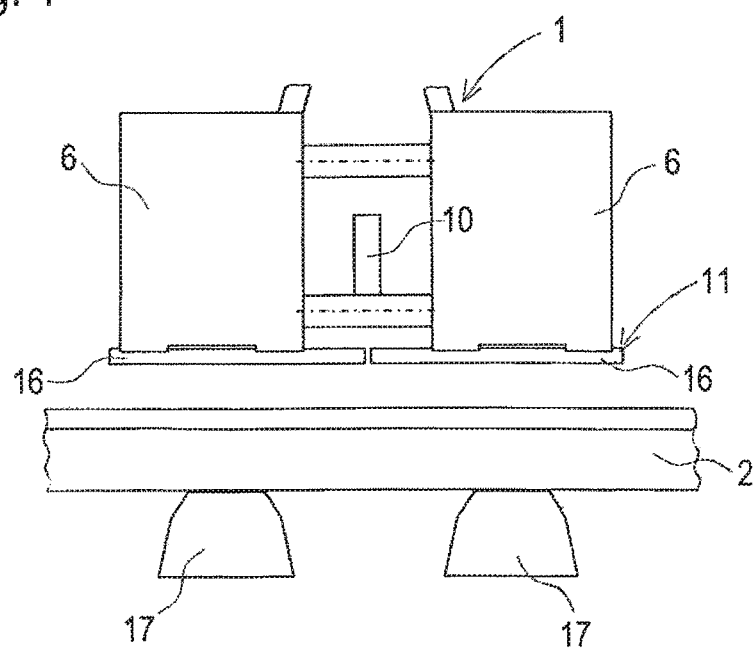

In FIGS. 3 and 4, a further variant of the support device 11 is shown which is adapted particularly to another type of a welding head 1 (see WO 2004/111340).

This support device 11 in the shape of a sliding rail 16 is designed to be displaceable in the guide longitudinal direction 5 relative to the welding unit 1. By means of a spring preload, the sliding rail 16 is displaceable automatically from an end position attainable with finishing a welding operation (see FIG. 3) back into an initial position (see FIG. 4). A displacement path delimited by the initial- and end positions measures at least 150 mm. A length, extending in the guide longitudinal direction 5, of the support device 11 or sliding rail 16 is configured to correspond at least to a distance of two adjacent sleepers 17 of the track 3.

To carry out a welding operation, the welding head 1—after centring with regard to the rail longitudinal direction—is set upon the sleepers 17 with placement of the total of four sliding rails 16. During this, the sliding rails 16 are in the initial position visible in FIG. 4. To execute the upset stroke finalizing the welding, the two welding units 6 are moved towards one another along the unit guide 4, wherein a relative displacement occurs in each case between sliding rail 16 and welding unit 6. The end position thus reached can be seen in FIG. 3. It goes without saying that the height of the sliding rails 16 must be configured such that an unhindered displacement of the welding units 6 across the rail fastenings, not shown here, is possible. After shearing off the weld bead, the welding head 1 is lifted by the crane, whereby the sliding rails 16 are automatically displaced into their initial position as a result of the spring preload (see FIG. 4).

The invention claimed is:

1. A welding head for welding rails of a track, the welding head comprising:
    first and second welding units disposed for movement towards one another along unit guides in a guide longitudinal direction;
    first and second clamping jaws to be applied to a rail web, said first clamping jaw being disposed at a lower end of said first welding unit and said second clamping jaw being disposed at a lower end of said second welding unit;
    a support device connected to said first welding unit and displaceable in a guide longitudinal direction relative to said first welding unit, said support device being configured for placement on the track during working operations.

2. The welding head according to claim 1, wherein said support device is a support ram hydraulically adjustable in a vertical direction.

3. The welding head according to claim 1, wherein said support device is one of two support devices fastened in each case at the lower end, adjoining said clamping jaws, of each said welding unit.

4. The welding head according to claim 1, wherein each of said welding units has two said support devices spaced from one another in a unit transverse direction and extending perpendicularly to the guide longitudinal direction, and wherein said clamping jaws are disposed between said two support devices.

5. The welding head according to claim 1, wherein said support device is a sliding rail which is spring preloaded for automatic displacement from an end position attainable with finishing a welding operation back into an initial position.

6. The welding head according to claim 5, wherein a displacement path delimited by the initial position and the end position measures at least 150 mm.

7. The welding head according to claim 5, wherein a length, extending in the guide longitudinal direction, of said support device is configured to amount to at least a distance between two adjacent sleepers of the track.

* * * * *